United States Patent [19]

Klinchurch

[11] Patent Number: 4,656,404
[45] Date of Patent: Apr. 7, 1987

[54] TURBINE-DIVEN LINEAR CONTROLLER FOR ELECTROMECHANICAL DEVICE AND METHOD

[75] Inventor: John F. Klinchurch, Orange, Calif.

[73] Assignee: Rockwell International Corporation, El Segundo, Calif.

[21] Appl. No.: 701,893

[22] Filed: Feb. 14, 1985

[51] Int. Cl.$^4$ .................. H02K 13/00; H02P 5/44
[52] U.S. Cl. ................................. 318/558; 318/361; 318/541
[58] Field of Search ............ 318/361, 542, 491, 541, 318/558; 290/52

[56] References Cited

U.S. PATENT DOCUMENTS

| | | | |
|---|---|---|---|
| 3,192,460 | 6/1965 | Wolff et al. | 318/542 X |
| 3,340,450 | 9/1967 | Stilley et al. | 318/491 X |
| 3,961,233 | 6/1976 | Fagg | 318/361 |
| 4,425,536 | 1/1984 | Larsen | 318/541 |

Primary Examiner—B. Dobeck
Attorney, Agent, or Firm—Jonathan B. Orlick; H. Frederick Hamann; George A. Montanye

[57] ABSTRACT

A turbine-driven apparatus and method for generating and linearly controlling periodic bipolar drive signals to drive an electromechanical device, such as a DC motor, in response to an input command signal. The apparatus comprises a rotatable cylindrical commutator driven by a gas turbine, the commutator having two matched half-cylinder conductive sections separated by insulation at the common joints. The turbine also drives an alternator to produce AC power which in turn is rectified to produce DC power. Two pairs of diametrically opposing brushes are held in contact with the rotating commutator. The first pair of brushes connected to the DC power source, is fixed in position. The second pair, connected across the electromechanical load, is adjustable in rotational position relative to the first pair through coupling to a stepper motor. The relative duty cycle of the positive going portion relative to the negative going portion of the bipolar signal is controlled by causing the stepper motor to adjust the rotational position of the second pair of brushes relative to the first pair of brushes.

16 Claims, 14 Drawing Figures

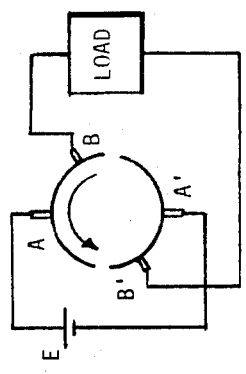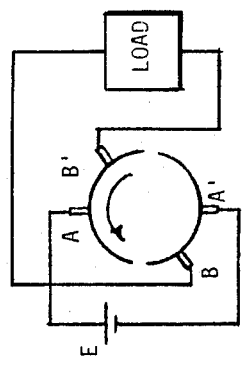
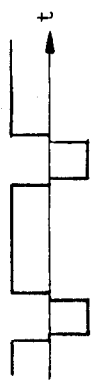
FIG. 4a  FIG. 4b
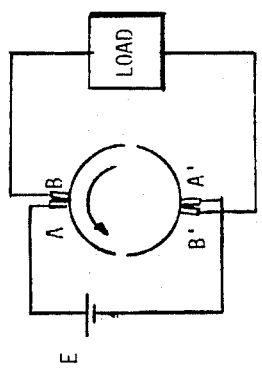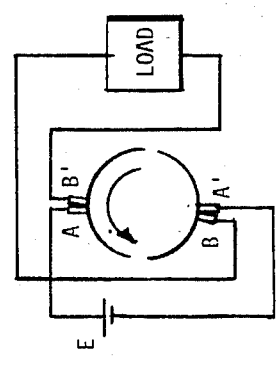
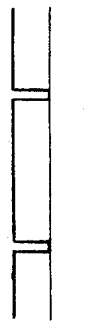
FIG. 4c  FIG. 4d
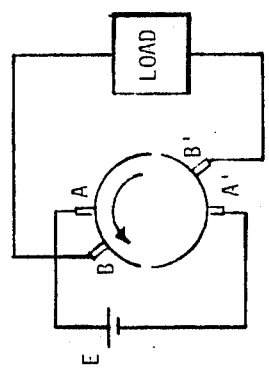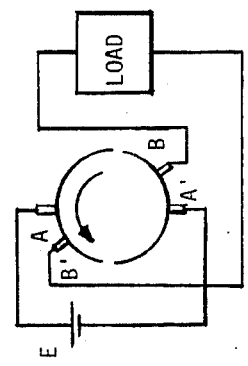
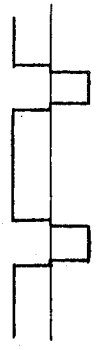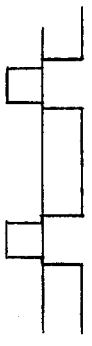
FIG. 4e  FIG. 4f
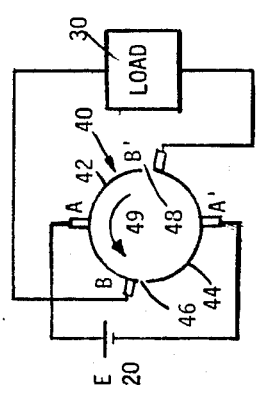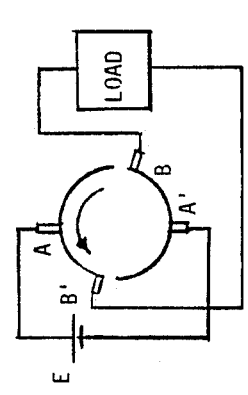
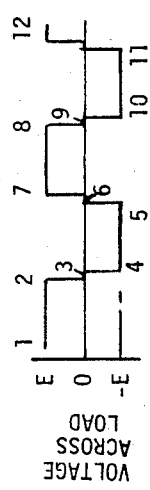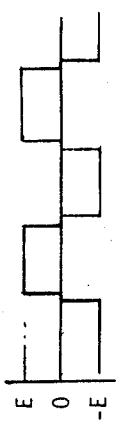
FIG. 4g  FIG. 4h

TURBINE-DIVEN LINEAR CONTROLLER FOR ELECTROMECHANICAL DEVICE AND METHOD

This invention was made with Government support under Contract No. F04704-C-84-0061 awarded by the Air Force. The Government has certain rights in this invention.

This invention is related to the invention of the application entitled LINEAR CONTROLLER FOR ELECTROMECHANICAL DEVICE AND METHOD by the inventor of the present invention, John F. Klinchuch.

BACKGROUND OF THE INVENTION

1. Field of the Invention

The present invention relates to a turbine-driven apparatus for generating and linearly controlling periodic bipolar drive signals to drive an electromechanical device, such as an electromechanical actuator system driven by a DC motor. A method for generating and linearly controlling periodic bipolar drive signals to drive such electromechanical devices is also described.

In the field of missile actuators which are used to move control surfaces or nozzles on missiles, electromechanical actuators have heretofore not been competitive with other types of actuators such as fluidic actuators (for more than 0.5 horsepower) because of the weight which is associated with the electronic controllers which are used to drive the electomechanical actuators. In general, electromechanical actuators require high power electronic controllers to meet the missile requirements. Typically, missile actuator systems and their associated electronics must be nuclear hardened. Heretofore, the existing hardened electronic controllers have been low power types. The high power controllers are either too heavy, or are not adequately hardened to nuclear radiation. Because the electromechanical actuator is relatively light weight, availability of high powered, nuclear hardened, relatively light weight controllers to drive such electromechanical actuators would make the electromechanical actuator a competitive candidate for the typical missile application.

SUMMARY OF THE INVENTION

It is therefore the object of the present invention to provide a nuclear hardened, relatively light weight controller to enable the use of electromechanical actuators, which actuator lends itself to lower overall lift-off weight for missile actuator systems.

It is a further object of this invention to provide an apparatus for generating and linearly controlling a periodic bipolar drive signal from a DC power source to drive an electromechanical device.

It is a further object of this invention to provide a turbine-driven apparatus for generating and linearly controlling periodic bipolar drive signals from an alternator to drive an electromechanical device such as a DC motor.

It is a further object of this invention to provide a linearly, pulse-width modulated motor driven with a low power controller requirement.

It is a further object of this invention to provide an apparatus which can be modified to drive more than one actuator by straightforward extension of the basic single actuator concept.

The controller for the present invention is an apparatus for generating and linearly controlling a periodic bipolar drive signal from a DC power source, such as a rectified output from an alternator driven by a turbine, in response to an input command signal to drive an electromechanical device, such as a DC motor, which in turn can be used as the thrust generating mechanism in a missile actuator. The apparatus, mounted on a base is comprised of a rotatable cylindrical commutator having a centered axis of rotation comprising complementary first and second half-cylinder sections having conductive exterior surfaces electrically isolated from each other.

Voltage is applied to this commutator from the DC source through a first pair of diametrically opposed conductive brushes which are fixed in angular position. Power is taken from the commutator and connected to the electromechanical device to be driven through a second pair of diametrically opposed conductive brushes which are adjustable in angular position relative to the fixed position of the first pair of brushes.

Attached to the base is a means which insulatively supports the first pair of brushes in contact with the exterior surface of the commutator sections. Attached to the base is a means which also insulative supports the second pair of brushes in contact with the exterior surface of the commutator sections and which additionally allows for adjusting the angular position of the second pair of brushes relative to the first pair of brushes, where the amount of adjustment is in linear response to the input command signal.

Also, the apparatus comprises a means for supporting and rotating the commutator at a rotational frequency which is one-half the desired frequency of the bipolar drive signal. Through the first and second pairs of brushes, the commutator commutates a bipolar driven signal to the electromechanical device at twice the commutator rotational frequency as the commutator rotates, wherein the average polarized current is linearly related to the difference in angular position of the second pair relative to the first pair of brushes.

In one configuration, a means for insulatively supporting the second pair of brushes and for adjustably setting the angular position of the second pair of brushes comprises a ring-shaped brush holder of inner diameter sufficient to encompass the commutator which has gear teeth on the outer surface and has two diametrically opposed brush-holding assemblies facing radially inward adjacent the inner surface of the holder, where each assembly insulatively holds a member of the second pair of brushes in resilient or spring loaded contact with the commutator exterior surface. Also, a stepper motor controller responsive to the input commands is provided for generating stepper motor control signals which are connected to the stepper motor to permit the angular stepwise adjustment of the stepper motor output shaft which in turn is geared and engaged with the gear teeth of the brush holder. This arrangement allows the brush holder to be adjusted in a linear and stepwise manner in response to the input command signal.

The first pair of brushes are held in fixed relation to the base and are supported by a pair of structural members attached to the base, to which are attached brush holders each of which in turn insulatively holds one of the first pair of brushes in resilient or spring-loaded contact with the commutator exterior surface.

The cylinder is rotated by shafts extending outwardly from end plates of the cylindrical commutator. Drive means are adapted to engage and rotate the outwardly extending shaft at one-half the desired frequency of the bipolar drive signal. In certain configurations, the drive means can comprise a gas turbine driven by a gas generator coupled to the turbine for driving the turbine where the turbine output is available at an output drive shaft. This drive shaft is adapted to engage and rotate the shaft extending outwardly from the commutator end plate.

In another configuration of the present invention, a turbine-driven apparatus is provided for generating and linearly controlling a bipolar drive signal to drive an electromechanical device in response to an input command signal. This apparatus is similar to the apparatus described above with the addition that it has a gas-driven turbine attached to the base with an output drive shaft and a gas generator to drive the turbine. An alternator which provides an AC output is driven by this output drive shaft. The AC output is rectified to provide the DC power which is applied to the first pair of brushes. The arrangement of the first and second pair of brushes is similiar to that described in the above configuration. Also, the turbine can be adapted and geared to provide the rotational drive to rotate the cylindrical commutator much as described in the configuration described above.

Where more than one electromechanical device is to be driven, the present invention can be extended to provide the necessary drive signals to these devices by pluralizing the number of AC outputs from the alternator, the number of rectifier circuits, the number of DC outputs, the number of cylindrical commutators, the number of first and second pairs of brushes, the number of means for insulatively supporting the first pair of brushes, and the number of means for insulatively supporting and individually adjusting and setting the angular position of the second pairs of brushes. Additionally, in this configuration the cylindrical commutators can all be driven simultaneously, where each of the cylindrical commutators is placed end to end with adjacent commutators in a single, structurally integrated cylinder, each commutator corresponding to a different one of the electromechanical devices to be driven and individually comprising complementary first and second half-cylindrical sections having conductive exterior surfaces and which are electrically isolated from each other and from the adjacent commutator sections. As in the single commutator configuration, the first pairs of brushes are used to apply the DC power to the commutator and the second pairs of brushes are used to take the power off and are connected to the electromechanical devices to be driven.

In the above multiple commutator configuration, a single gas-driven turbine can be used to drive all of the commutators together and to provide the necessary rotational torque to drive the alternator which provides the plurality of AC outputs. In turn, these AC outputs are individually rectified to provide the plurality of DC outputs, which are applied individually through the first pairs of brushes to the plurality of commutators.

Also described is a method of generating and linearly controlling a bipolar signal to drive an electromechanical device in response to an input command signal using the apparatus of the present invention.

BRIEF DESCRIPTION OF THE DRAWINGS

FIG. 4a through 4h are schematic diagrams and voltage waveforms for various positions of the second pair of brushes of the present invention.

DESCRIPTION OF THE PREFERRED EMBODIMENTS

The purpose of the present invention is to commutate power from a DC source to a load in varying duty cycle of alternating positive and negative polarities. If the load is an electromechanical device such as a DC motor, application of a bipolar signal to the DC motor will effect a mechanical output from the DC motor corresponding to the polarity of the signal applied thereto. If the signal applied is a bipolar signal, and the motor responds to the net average power delivered to the motor of one polarity as opposed to the other a net mechanical output in a preferred direction will result. Thus, by varying the duty cycle of the positive and negative going portions of a bipolar signal relative to each other, one can effect a change in the net DC power delivered to the load of a particular polarity, and therefore effect a change in the mechanical output of that motor. The present invention, in its several embodiments as to be described hereinbelow, provides the necessary linear control over the positive versus negative duty cycle of the signal which is delivered to the electromechanical load.

Figure 1:
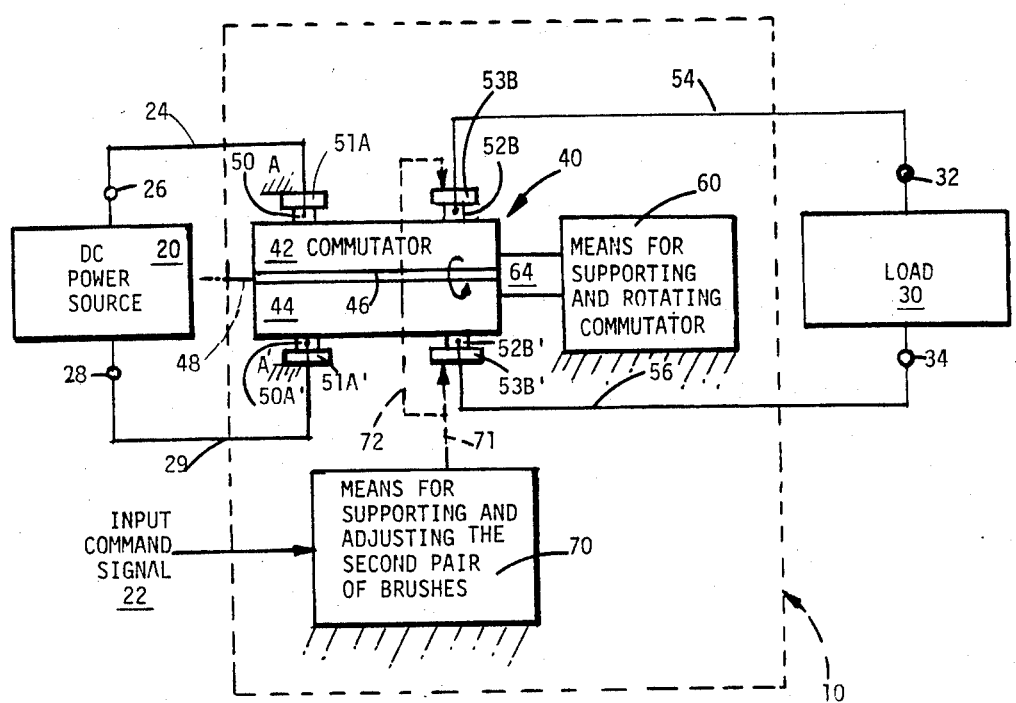
FIG. 1 is a block diagram of a first embodiment of the present invention.

Referring to FIG. 1, a preferred embodiment of the present invention is shown in block diagram form. The elements comprising this embodiment are enclosed within a dashed block 10 which is placed functionally between a DC power source 20 and a load 30. Load 30 can be an electromechanical device which is being supplied a periodic bipolar drive signal. The elements enclosed within block 10 represent the apparatus of the present invention which generates and linearly controls a periodic bipolar driven signal from DC power source 20 in response to an input command signal 22 to drive load 30, such as an electromechanical device. Power is supplied from DC power source 20 on supply voltage terminal 26 to conductive brush 50A over lead 24 and on reference terminal 28 to conductive brush 50A' over lead 29. Connection between the load 30 and the apparatus 10 is made between conductive brush 52B and load terminal 32 over lead 54 and between conductive brush 52B' and load terminal 34 over lead 56.

Shown enclosed in dashed box 10 are the first pair of brushes 50A, 50A', the second pair of brushes 52B, 52B', commutator 40, means for supporting and rotating the commutator 60, and means for supporting and adjusting the second pair of brushes 70. Not shown specifically but only symbolically is a base to which brush holders 51A and 51A', means for supporting and rotating commutator 60, and means for supporting and adjusting the second pair of brushes 70 are attached.

Commutator 40 is a rotatable cylindrical commutator having a centered axis of rotation 48 comprising complementary first and second half-cylinder sections 42, 44, respectively, having conductive exterior surfaces electrically isolated from each other by isolation strip 46 and another isolation strip (not shown) diametrically opposed to isolation strip 46. The first pair of brushes 50A, 50A' are diametrically opposed conductive brushes fixed in angular position and connected as described above. The second pair of brushes 52B, 52B' are diametrically opposed conductive brushes adjustable in angular position relative to some reference position and connected to load 30 such as an electromechanical device as described above. Also shown are brush holders 51A, 51A' which are attached to the base and which are means for insulatively supporting the first pair of brushes in contact with the exterior surface of commutator sections 42, 44. In like manner, a second pair of brush holders 53B, 53B' are used to insulatively hold the second pair of brushes 52B, 52B', respectively, in contact with the exterior surface of commutator sections 42, 44. These holders 53B, 53B' are adjustable in their angular position about the cylindrical commutator relative to the position of the first pair of brushes 50A, 50A' in linear response to input command signal 22 which is applied to the means 70 for supporting and adjusting the second pair of brushes.

Dashed lines 71, 72, with arrow heads leaving the block 70 entitled MEANS FOR SUPPORTING AND ADJUSTING THE SECOND PAIR OF BRUSHES and directed to holders 53B' and 53B, respectively, represent the mechanical control which block 70 exercises over the position of the pairs of brushes 52B, 52B' and brush holders 53B, 53B' in response to input command signal 22.

Block 60 entitled MEANS FOR SUPPORTING AND ROTATING COMMUTATOR is coupled to commuator 40 by shaft 64. Shaft 64 is caused to rotate by means for supporting and rotating the commutator 60. As shaft 64 rotates, apparatus 10 will commutate a bipolar drive signal of twice the commutator rotational frequency to load 30 such that the average polarized current applied to the load is linearly related to the difference in angular position between the first pair of brushes 50A, 50A' and the second pair of brushes 52B, 52B'.

Figure 2:
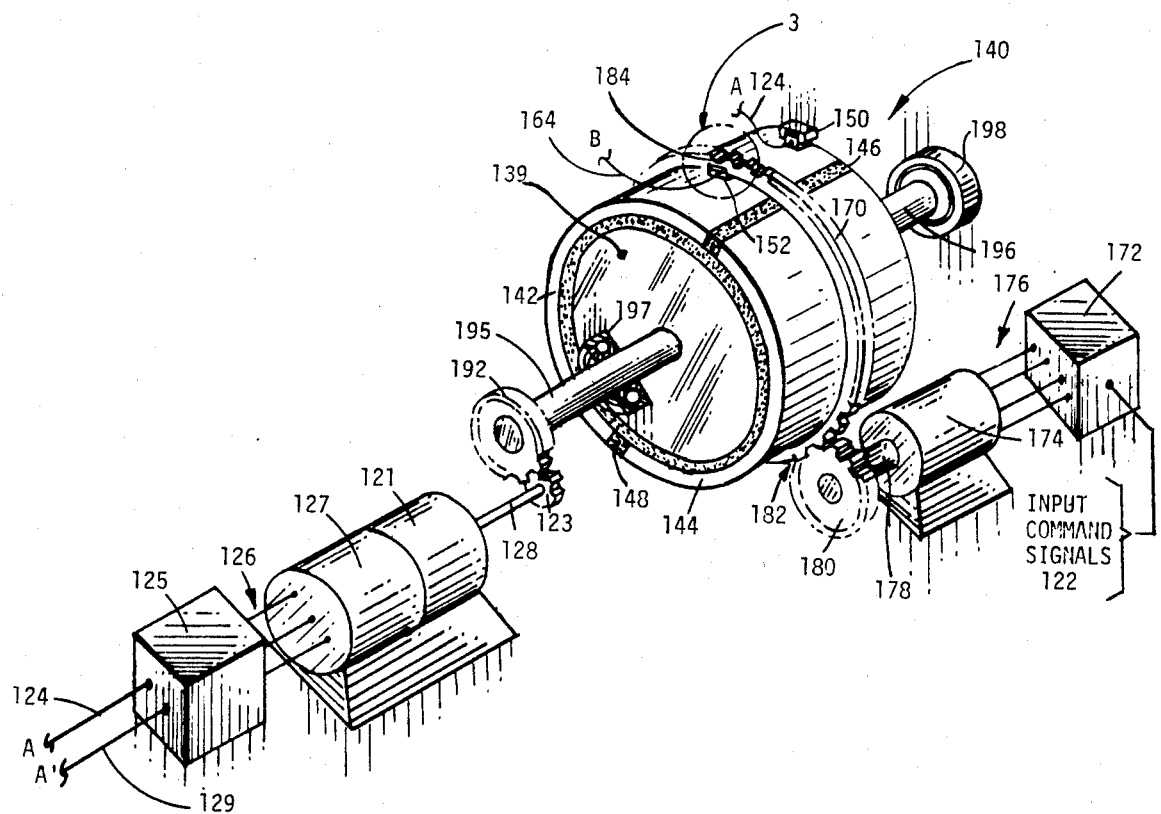
FIG. 2 is a perspective drawing of the present invention showing details of the commutator, brushes, commutator drive, and brush adjustment apparatus.
Figure 3:
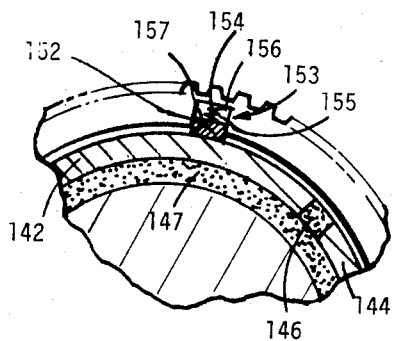
FIG. 3 is an expanded cross sectional view at circular cut 3 of FIG. 2.

A more specific embodiment of means 70 for supporting and adjusting the second pair of brushes 52B, 52B' is shown in FIGS. 2 and 3. In FIG. 2, a perspective view of the present invention is shown partially in cross section. FIG. 3 shows an expanded cross sectional view of one portion of the apparatus of FIG. 2 taken along circular cut 3. In a collective sense, there are shown in FIG. 2 means for supporting and adjusting the second pair of brushes, correspnding to block 70 of FIG. 1, comprising ring-shaped brush holder 170, stepper motor controller 172 responsive to input command signals 122. Stepper motor 174 is responsive to the stepper motor control signals on leads 176 from stepper motor controller 172. Stepper motor 174 is shown symbolically attached to a structure, in this case a base which is not shown specifically.

The output of the stepper motor 174 is an angularly stepwise adjustable output shaft 178 which has a gear 180 concentrically attached to shaft 178. The outwardly-facing surface of the brush holder 170 has gear teeth shown partially at 182 and 184. Gear 180 is shown meshed with gear teeth 182 on brush holder 170. As shaft 178 of the stepper motor is adjusted, ring-shaped brush holder 170 is moved to a different angular position. As holder 170 is adjusted to a different position, any assemblies which are attached to it are also adjusted to a different position. Therefore, brush 152, which is one member of a pair of diametrically opposed conductive brushes, is also moved to a new setting. The relationship of angular position of such a pair of which brush 152 is a member, relative to the position of the fixed brushes, one member of which is brush 150, causes a different polarized duty cycle signal to be produced and delivered to the load such as 30 in FIG. 1.

In FIG. 3, there is shown in more detail the various interfacing elements of the commutator brush and brush holder. Shown in the figure is a brush holding assembly 153, a spring 154, and an insulated recess 155 which together act to retain brush 152 in resilient contact with the outer surface of conductive half-cylinder layer 142. The exterior surface of commutator 140 is a combination of conductive half cylinder surfaces of sections 142 and 144 separated by insulating materials 146 and 148. Shown underlaying conductive half-cylinders 142 and 144 is an insulating layer 147. The resilient contact of brush 152 with the conductive layer 142 is obtained by use of spring 154 which is compressed between the back surface 157 of brush 152 and the floor 156 of the recess 155. The brushes of the first pair, of which brush 150 is one member, are similarly maintained in resilient contact with the exterior surface of commutator 140.

Attached to the near end of commutator 140 in FIG. 2 is a circular end plate 139 to which is rigidly attached a shaft 195. A like circular end plate (not shown) is attached to the far end of commutator 140 to which shaft 196 is also rigidly attached. Bearings 197, 198 are shown partially in cross section, partially in elevation symbolically attached to a structural base (not shown) for supporting commutator 140 freely of rotation of the commutator about its axis. At the end of the shaft 195 opposite to which it is attached to the circular end plate 139, there is attached a gear 192. Gear 192 is engaged with gear 123 which is attached to shaft 128. Shaft 128 extends outwardly from gas generator/turbine 121. Gas generator/turbine 121, symbolically attached to a base (not shown), comprises both a gas-driven turbine and a gas generator used to drive the turbine. Commutator 140 is caused to rotate about coaxially-aligned shafts 195 and 196 by the motive force of the turbine which has output shaft 128 to which gear 123 is attached. The ratio of gearing between gear 192 and gear 123 is selected to provide the commutator 140 with the appropriate rotation frequency in view of the rotation frequency of turbine output shaft 128.

An alternator 127 is shown also coupled to gas generator/turbine 121 and is driven by the turbine. AC power outputs from alternator 127 are connected to a rectifier circuit 125 over leads 126. Brush 150, which is a member of the first pair of brushes, is connected to one of the DC power output terminal leads 124 of rectifier circuit 125. The other lead 129 goes to the other member of the first pair of brushes which member is not shown.

PRINCIPLES OF OPERATION

The principles of operation of the present invention are explained by referring to FIGS. 4a through FIG. 4h. In these figures, the top portion of each of the figures shows the schematic diagram of the electrical portion of the present invention. In the lower portion of each figure, the corresponding typical waveform of the signal which is applied to the load, such as a DC motor is shown. For example, in FIG. 4a, the schematic diagram shows connections from a second pair of brushes B, B' to the load 30. The power source is shown as a battery of output E. A first (fixed) pair of brushes is indicated by A, A'. A two-section commutator is symbolized by a circle 40 broken in two diametrically opposite places. The rotational direction of the commutator is indicated by an arrow 49 inside of broken circle 40. The two diametrically opposite breaks 46, 48 in the circle are symbolic of the electrical insulation or isolation provided between the two conductive half-cylinder sections 42, 44 of commutator 40.

As commutator 40 rotates (in a counter clockwise direction in the example shown), the waveform starts out with a +E voltage being applied across the load from top to bottom between point 1 and 2 of the waveform at the bottom of FIG. 4a. Further rotation to the point where break 48 lies under brush A and break 46 lies above brush A', causes the voltage applied across commutator 40 to go to 0 as indicated at point 3 of the voltage waveform. As commutator 40 rotates beyond that point, the voltage applied to the two sections 42 and 44 through brushes A, A' now reverses, such that the voltage applied to the load through the brushes B, B' also reverses to −E, such as is shown between points 4 and 5 of the waveform. As the commutator rotates further, such that opening 46 now lies below brush A and opening 48 now lies above brush A', once again the voltage applied across the commutator goes to 0 as shown at point 6. As commutator 40 rotates beyond this point, the voltage once again reverses and a positive +E voltage is then applied to the load 30 from the brushes B, B'. This positive voltage contains from points 7 to 8 of the waveform and once again reverses voltage between points 10 and 11 until commutator 40 has made one complete revolution and begins the next revolution at 12. Note that the voltage has advanced through two complete cycles of the waveform whereas the commutator has made only one complete revolution. Therefore, as commutator 40 makes one complete revolution the voltage waveform applied to load 30 will undergo two complete cycles.

The signal waveform applied to the load 30 of FIG. 4a can be modified by changing the relative positions of brush pair B, B' relative to the position of the fixed pair A, A', such as is shown in FIGS. 4b through 4h. As can be seen from FIGS. 4b, 4c, and 4d, the duty cycle of the positive portion of the signal relative to the negative portion of the signal can be made favorably positive by adjusting the position of the primed brushes A', B' (and correspondingly unprimed brushes A, B) to be closer together in angular position. Conversely, increasing the angular separation between primed brushes A', B' tends to make the average of the generated bipolar signal to be more negative on average as exemplified by FIGS. 4f through 4h. Comparing the waveforms of 4c and 4g, it can be seen that a substantially positive DC or negative DC voltage can be applied across the load by the appropriate adjustment of the position of the B, B' pair of brushes relative to the position of the A, A' pair of brushes. Where the load is a DC motor, the output from that motor can be made to move correspondingly in opposite directions, for example by causing an output shaft to move either clockwise or counterclockwise relative to some reference direction. Such an output rotational motion can be translated into an actuating event, for example, where a valve can be actuated or a nozzle or a control surface on a missile can be caused to move.

Figure 5:
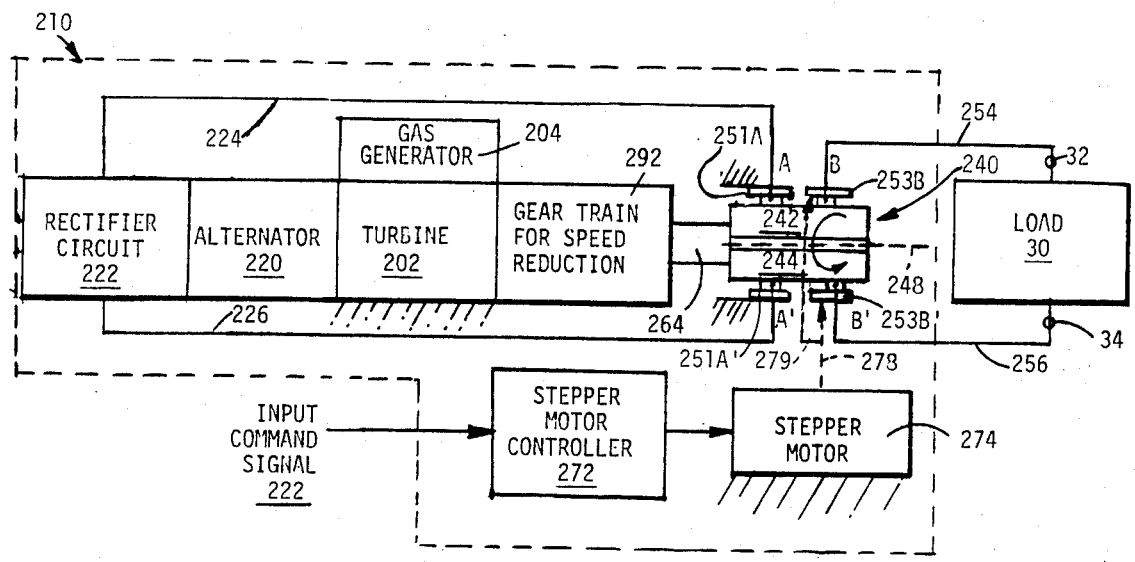
FIG. 5 is a block diagram of another embodiment of the present invention.

Referring next to FIG. 5, there is shown a turbine-driven apparatus for generating and linearly controlling a periodic bipolar drive signal to drive an electromechanical device. The distinguishing feature of this invention, in relation to the embodiment shown in the block diagram of FIG. 1 and in terms of the blocks shown there, is the inclusion of the DC power source 20 as part of the invention. In FIG. 5, the invention comprises those elements lying within the dashed box 210. As in the embodiment of FIG. 1, the load 30 can be the same type of load as described for FIG. 1.

Comprising this turbine-driven apparatus are a base, indicated only symbolically, a gas driven turbine 202 shown symbolically attached to the base, a gas generator 204 coupled to the turbine for driving the turbine, and alternator 220 coupled to and driven by an output drive shaft (not shown) for providing an AC power output which is coupled to rectifier circuit 222 which in turn provides a DC power output which is applied to the first pair of brushes A, A' over leads 224 and 226. In some applications, typically where the load impedance has an inductive component, it is beneficial to drive the load from a high impedance source, essentially a current source, such that arcing and consequent brush burnout can be minimized. For this type of application, then, the turbine-driven alternator/rectifier combination provides a well suited DC power source since this combination functions much as a current source in the context of the present invention.

In FIG. 5, there is shown a commutator 240 which is of the same type as commutator 40 shown in FIG. 1 and described with reference thereto. The arrangements of the first and second pair of brushes A, A' and B, B' are also the same as shown with reference to FIG. 1. A stepper motor controller 272 receives an input command signal 222. The output of stepper motor controller 272 is fed to a stepper motor 274 to control the stepper motor. The output of stepper motor 274 is shown symbolically connected to brush holders B, B' by dashed lines 278, 279. A gear train 292 for speed reduction is interposed between turbine 202 and commutator 240. Additionally, gear train 292 is coupled to commutator 240 through shaft 264. Brush pair B, B' is connected electrically to the load at terminals 32 and 34 over leads 254 and 256. Also, a pair of brush holders 251A and 251A' attached to the base, insulatively hold the first pair of brushes A, A' in resilient contact with the exterior surface of the commutator sections 242 and 244. Gas generator 204, turbine 202, gear train 292, and drive shaft 264 which can be appropriately supported by bearings such as is shown in FIG. 2, together provide means for insulatively supporting and rotating commutator 240 at a given rate in electrical contact with the first and second pairs of brushes A, A' and B, B'. The second pair of brushes B, B' are supported by a pair of brush holders 253B and 253B', such as are shown in FIG. 2, and are adjustably set in angular position relative to the position of the first pair of brushes A, A' in response to input command signal 222 which is used to linearly control the periodic drive signal applied to load 30, such as an electromechanical device, in correspondence to the angular position of the second pair of brushes B, B' as commutator 240 rotates about its centered axis of rotation 248. A typical physical arrangement for the configuration of FIG. 5 is shown in FIGS. 2 and 3.

Figure 6:
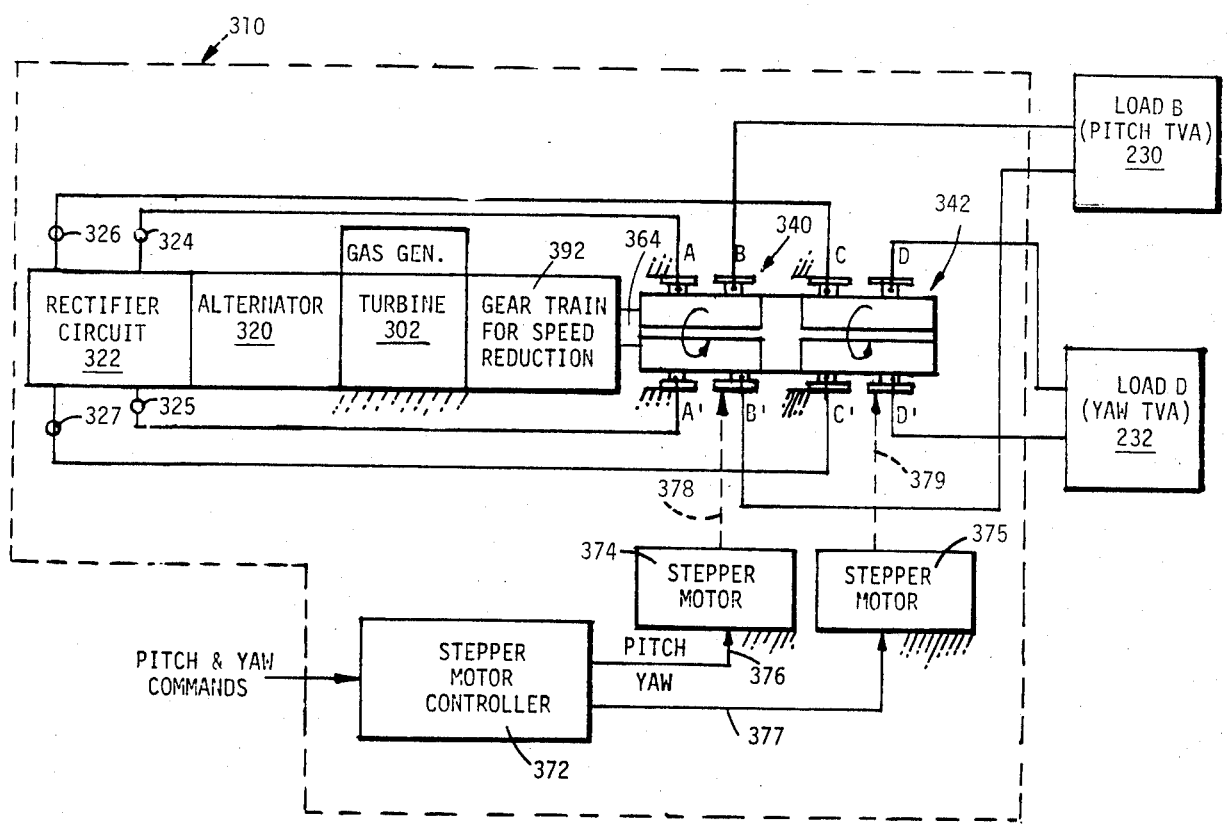
FIG. 6 is a block diagram of another embodiment of the present invention as applied to missile thrust-vector actuators (TVA's).

Referring next to FIG. 6, there is shown in dashed block 310 an extension of the basic embodiment of FIG. 5 to an application for providing two bipolar periodic drive signals, one signal to each of two loads, load B 230 and load D 232. In the specific application shown here, these two loads are two thrush vector actuators (TVA), one for the Pitch axis and one of the Yaw axis of a missile. Correspondingly, Pitch and Yaw commands are provided to a stepper motor controller 372 which in turn provides Pitch and Yaw control signals to respective stepper motors 374, 375 over leads 376, 377. Each of these stepper motors in turn controls the position of brush holders for brushes B, B' and D, D'. This is shown symbolically by dashed lines 378, 379. Two commutators 340, 342 can be ganged together on a single substructure which in turn is driven by a turbine 302 through gear train speed reduction 392 via shaft 364. The operation of the individual commutators is identical to that described with reference to FIG. 5.

Figure 7:
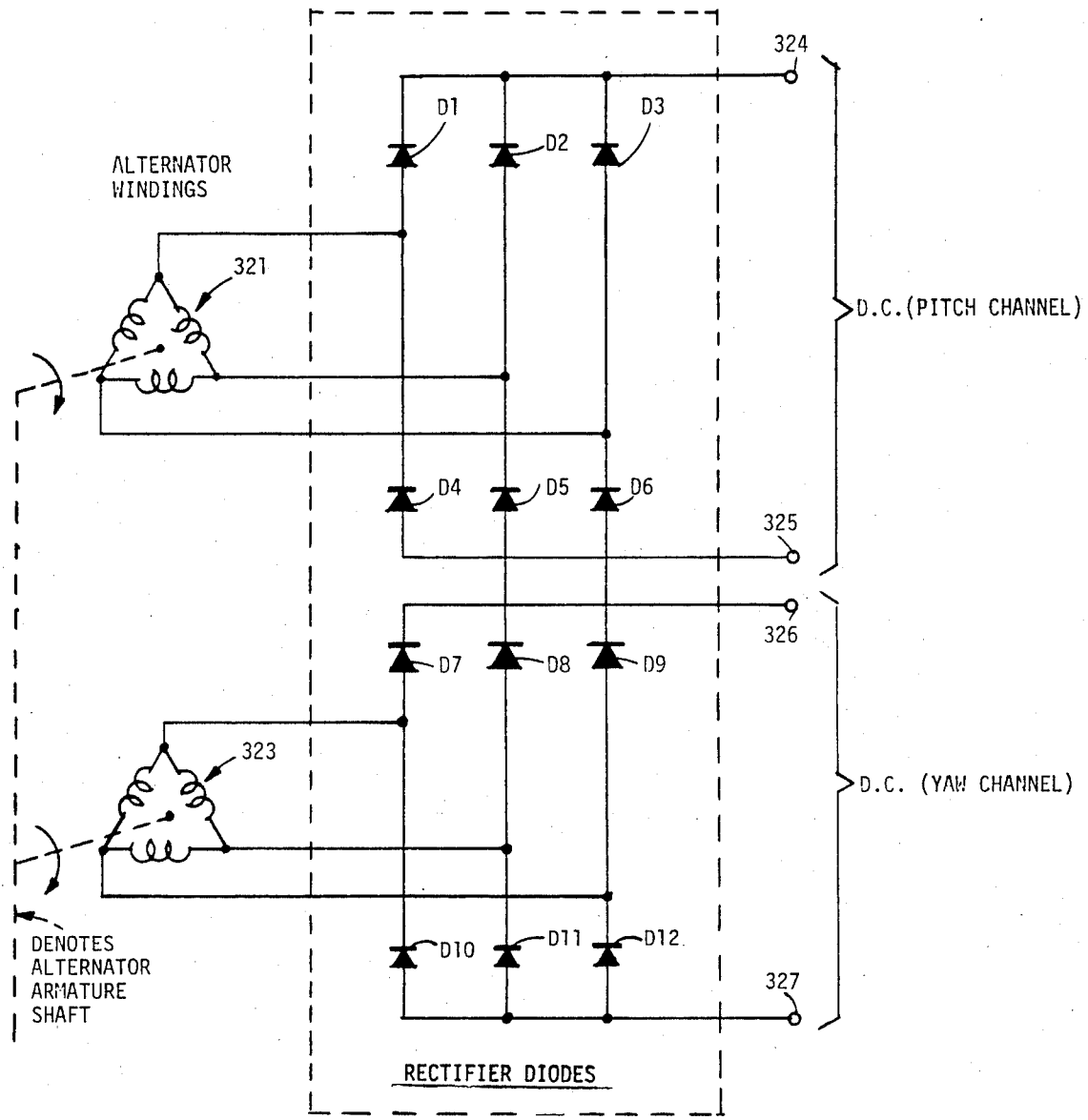
FIG. 7 is a schematic diagram of part of the alternator and the rectifying circuit of the present invention.

Referring next to FIG. 7, there is shown a typical connection of alternator windings 321, 323 corresponding to alternator 320 of FIG. 6 and rectifier circuits providing the DC power to the Pitch brushes A, A' and Yaw brushes C, C' of FIG. 6. The rectifier diodes D1 through D6 provide a full-wave rectified output at terminals 324 and 325. Similarly, diodes D7 through D12 provide a full-wave rectified output at terminals 326 and 327. These outputs are shown in FIG. 6 connected to the first pairs of brushes A, A' and C, C' on each of the two commutators 340, 342, respectively.

Another embodiment of the present invention concerns a method of generating and linearly controlling a bipolar drive signal to drive an electromechanical device, such as a DC motor, using apparatus of the type described hereinabove with reference to FIGS. 1 through 5. With reference to FIG. 2, the first step of this method is providing a cylindrical commutator, such as 140, comprised of complementary first and second half cylinder sections 142, 144, having conductive exterior surfaces electrically isolated from each other, such as by insulations 146 and 148. The next step is simultaneously holding first and second pairs of diametrically opposed conductive brushes, of which brush 150 is an example of one member of such first pair, and brush 152 is an example of one member of such second pair against the exterior surface of the cylindrical commutator 140, the first pair in a fixed angular position and the second pair in an adjustable angular position.

These steps are followed by the steps of applying power across the first pair of brushes from a DC power source, for example as indicated by the combination of gas generator/turbine 121 and alternator 127 shown connected via leads 126 to the rectifier 125, followed by connecting the second pair of brushes to the electromechanical device, such as load 30 in FIGS. 1, 4, and 5. These steps are then followed by alternately commutating polarized signals, such as is exemplified by the waveforms in FIG. 4, to the electromechanical device 30 by rotating the commutator 140 about its axis at one-half the desired frequency of the resulting bipolar signal, and further followed by adjusting the relative angular position of the second pair of brushes relative to the first pair of brushes in response to the input command signal 22, or 122, or 222 of FIGS. 1, 2, and 5, respectively, to obtain the desired duty cycle of opposing polarities, thereby effecting a change in the average current of the respective polarities delivered to the electromechanical device 30.

The above method can further include the steps of generating propulsive gases to drive a turbine such as is produced by the gas generator 204 of FIG. 5, and coupling the propulsive gases so produced to the turbine 202 to generate torque delivered to an output drive shaft coupled to a gear train 292, and followed by steps of generating an AC power signal by coupling the turbine to an alternator, such as alternator 220, and then rectifying the AC power signal so produced by the alternator to produce DC power which is applied across the first pair of brushes 251A and 251A', this rectification being accomplished by a rectifier circuit such as circuit 222 of FIG. 5 or one full-wave rectifying section of FIG. 7.

This method can also include an additional step of gear coupling the turbine shaft to the cylindrical commutator to cause the commutator to rotate at one-half the desired frequency of the bipolar signal, such as by use of a gear train for speed reduction 292 of FIG. 5 which has an output shaft 264 connected to the commutator 240.

As would be apparent to one skilled in the art, other ordering of the steps in the method can be made without altering the basic utility and novelty of the present invention.

Although the invention has been described and illustrated in detail, it is clearly to be understood that the same is by way of illustration only and is not to be taken by way of limitation, the spirit and scope of this invention being limited by the terms of the appended claims.

What is claimed is:

1. An apparatus for generating and linearly controlling a periodic bipolar drive signal from a DC power source having supply voltage and reference terminals in response to an input command signal to drive an electromechanical device, said apparatus comprising:

a base;

a rotatable cylindrical commutator having a centered axis of rotation comprising complementary first and second half-cylinder sections having conductive exterior surfaces electrically isolated from each other;

a first pair of diametrically opposed conductive brushes fixed in angular position comprising a first brush connected to said supply voltage terminal and a second brush connected to said reference terminal for electrically connecting said DC power source to said commutator;

a second pair of diametrically opposed conductive brushes adjustable in angular position connected to said electromechanical device for electrically connecting said commutator to said electromechanical device;

means attached to said base insulatively supporting said first pair of brushes in contact with said exterior surface of said commutator sections;

means attached to said base insulatively supporting said second pair of brushes in contact with said exterior surface of said commutator sections and for adjustably setting the angular position of said second pair of brushes relative to said first pair of brushes in linear response to said input command signal; and means coupled to said commutator for supporting and rotating said commutator at a rotational frequency equal to one-half the desired frequency of said bipolar drive signal;

said commutator commutating bipolar drive signals of twice the commutator rotational frequency to said electromechanical device wherein the average polarized current is linearly related to the difference in angular position of said second pair of brushes relative to said first pair of brushes.

2. The apparatus according to claim 1, wherein said means insulatively supporting said second pair of brushes and for adjustably setting the angular position of said second pair of brushes comprises:

a ring-shaped brush holder of inner diameter sufficient to encompass said commutator having gear teeth on the outer surface of said holder and having two diametrically opposed brush-holding assemblies facing radially inward adjacent the inner surface of said holder, each assembly insulatively holding a member of said second pair of brushes in resilient contact with said commutator exterior surface;

a stepper motor controller responsive to said input commands for generating stepper motor control signals; and a stepper motor responsive to said stepper motor control signals attached to said base having an angularly stepwise adjustable output shaft geared and engaged with the gear teeth of said brush holder.

3. The apparatus according to claim 2, wherein said means supporting said first pair of brushes comprises:

a pair of structural members attached to said base; and a pair of brush holders, one holder attached to each member of said pair of structural members insulatively holding a member of said first pair of brushes in resilient contact with said commutator exterior surface.

4. The apparatus according to claim 1:

wherein said commutator comprises first and second circular end plates attached to each end of said half-cylinder sections, and first and second shafts attached to the external surface of said first and second end plates, respectively, concentric with said commutator centered axis of rotation to extend outwardly from said commutator; and wherein said means for supporting and rotating said commutator comprises bearing means attached to said base adapted to support said first and second shafts freely of commutator rotation about said centered axis, and drive means adapted to engage and rotate said first shaft and said commutator at one-half the desired frequency of said bipolar drive signal.

5. The apparatus according to claim 4 wherein said drive means comprises:

a gas-driven turbine attached to said base having an output drive shaft; and a gas generator coupled to said turbine for driving said turbine.

6. The apparatus according to claim 5, wherein said means insulatively supporting said second pair of brushes and for adjustably setting the angular position of said second pair of brushes comprises:

a ring-shaped brush holder of inner diameter sufficient to encompass said commuator having gear teeth on the outer surface of said holder and having two diametrically opposed brush-holding assemblies facing radially inward adjacent the inner surface of said holder, each assembly insulatively holding a member of said second pair of brushes in resilient contact with said commutator exterior surface;

a stepper motor controller responsive to said input commands for generating stepper motor control signals; and a stepper motor responsive to said stepper motor control signals attached to said base having an angularly stepwise adjustable output shaft geared and engaged with the gear teeth of said brush holder.

7. The apparatus according to claim 6, wherein said means supporting said first pair of brushes comprises:

a pair of structural members attached to said base; and a pair of brush holders, one holder attached to each member of said pair of structural members insulatively holding a member of said first pair of brushes in resilient contact with said commutator exterior surface.

8. A turbine-driven apparatus for generating and linearly controlling a periodic bipolar drive signal to drive an electromechanical device in response to an input command signal, said apparatus comprising:

a base;

a gas-driven turbine attached to said base having an output drive shaft;

a gas generator coupled to said turbine for driving said turbine;

an alternator coupled to and driven by said output drive shaft providing an AC power output;

a rectifier circuit connected to said alternator providing a DC power output;

a rotatable cylindrical commutator having a centered axis of rotation comprising complementary first and second half-cylinder sections having conductive exterior surfaces electrically isolated from each other;

a first pair of diametrically opposed conductive brushes fixed in angular position, said DC power output connected between said first pair of brushes;

a second pair of diametrically opposed conductive brushes adjustable in angular position, said electromechanical device connected between said second pair of brushes;

means attached to said base insulatively supporting said first pair of brushes in contact with said exterior surfaces of said commutator sections;

means attached to said base coupled to and driven by said output drive shaft for insulatively supporting and rotating at a given fixed rate said commutator in electrical contact with said first and second pairs of brushes in linear response to said input command signal; and means attached to said base insulatively supporting said second pair of brushes in contact with said exterior surface of said commutator sections and for adjustably setting the angular position of said second pair of brushes relative to said first pair of brushes in response to said input command signal to linearly control the periodic bipolar drive signal applied to said electromechanical device corresponding to said angular position of said second pair of brushes as said commutator rotates about said centered axis of rotation.

9. The apparatus according to claim 8:

wherein said commutator comprises first and second circular end plates attached to each end of said half-cylinder sections, and first and second shafts attached to the external surface of said first and second end plates, respectively, concentric with said commutator centered axis of rotation to extend outwardly from said commutator; and wherein said means for supporting and rotating said commutator comprises bearing means attached to said base for supporting said first and second shafts freely of commutator rotation about said centered axis, and drive means for engaging and rotating said first shaft and thereby rotating said commutator at one-half the desired frequency of said bipolar drive signal.

10. The apparatus according to claim 9, wherein said means insulatively supporting said second pair of brushes and for adjustably setting the angular position of said second pair of brushes comprises:

a ring-shaped brush holder of inner diameter sufficient to encompass said commutator having gear teeth on the outer surface of said holder and having two diametrically opposed brush-holding assemblies facing radially inward adjacent the inner surface of said holder, each assembly insulatively holding a member of said second pair of brushes in resilient contact with said commutator exterior surface;

a stepper motor controller responsive to said input command signal for generating stepper motor control signals; and a stepper motor responsive to said stepper motor control signals attached to said base having an angularly stepwise adjustable output shaft geared and engaged with the gear teeth of said brush holder.

11. The apparatus according to claim 10, wherein said means supporting said first pair of brushes comprises:

a pair of structural members attached to said base; and a pair of brush holders, one attached to each member of said pair of structural members insulatively holding a member of said first pair of brushes in resilient contact with said commutator exterior surface.

12. A turbine-driven apparatus for generating and linearly controlling a plurality of periodic drive signals to drive a corresponding plurality of electromechanical devices in response to corresponding input command signals, said apparatus comprising;

a base;

a gas-driven turbine attached to said base having an output drive shaft;

a gas generator coupled to said turbine for driving said turbine;

an alternator coupled to and driven by said turbine output drive shaft providing a plurality of AC power outputs;

a rectifier circuit connected to said alternator providing a plurality of DC power outputs, one DC output corresponding to each of said electromechanical devices to be driven;

a plurality of cylindrical commutators in fixed end-to-end coaxial arrangement with each other, each commutator corresponding to a different one of said electromechanical devices to be driven and comprising complementary first and second half-cylinder sections having conductive exterior surfaces electrically isolated from each other and from adjacent commutator sections;

a plurality of first pairs of diametrically opposed conductive brushes fixed in angular position, a different one of said plurality of DC outputs connected between each of said first pairs of brushes;

a plurality of second pairs of diametrically opposed conductive brushes adjustable in angular position, a different one of said plurality of electromechanical devices connected between each of said second pair of brushes;

means attached to said base insulatively supporting each of said plurality of first pairs of brushes in contact with said exterior surfaces of corresponding ones of said plurality of commutators;

means attached to said base coupled to and driven by said output drive shaft for insulatively supporting and rotating at a given fixed rate, said plurality of commutators in electrical contact with corresponding ones of said plurality of first and second pairs of brushes in response to corresponding input command signals; and means attached to said base for insulatively supporting each of said plurality of second pairs of brushes in contact with said exterior surface of corresponding ones of said commutators and individually adjusting and setting the angular position of each of said plurality of second pairs of brushes relative to corresponding ones of said plurality of first pairs of brushes in response to corresponding ones of said plurality of input command signals to linearly control the periodic bipolar signals applied to corresponding ones of said plurality of electromechanical devices in correspondence with the angular position of said corresponding second pair of brushes as said plurality of commutators rotates simultaneously about said centered axis of rotation.

13. The apparatus according to claim 12:

wherein said fixed end-to-end arrangement of said plurality of commutators defines a cylindrical structure having a driven end and a supported end and a centered axis of rotation, said structure further comprising first and second end plates attached to said driven and supported ends, respectively, and first and second shafts attached to the external surface of said first and second end plates, respectively, extending outwardly from said commutator concentric with said axis of rotation; and wherein said means for insulatively supporting and individually adjusting and setting the angular position of each of said plurality of second pairs of brushes comprises bearing means attached to said base for supporting said first and second shafts freely of commutator rotation about said centered axis, and drive means for engaging and rotating said first shaft and thereby rotating said structure at one-half the desired frequency of said plurality of bipolar drive signals.

14. A method of generating and linearly controlling a bipolar signal to drive an electromechanical device in response to an input command signal, including the steps of:

providing a cylindrical commutator comprised of complementary first and second half-cylinder sections having conductive exterior surfaces electrically isolated from each other;

holding a first pair of diametrically opposed conductive brushes simultaneously against the exterior surface of said cylindrical commutator in a fixed angular position;

holding a second pair of diametrically opposed conductive brushes simultaneously against the exterior surface of said cylindrical commutator in an adjustable angular position;

applying power from a DC power source across said first pair of brushes;

connecting the second pair of brushes to said electromechanical device;

alternately commutating polarized signals to the electromechanical device by rotating said commutator about its axis at one-half the desired frequency of the resulting bipolar signal;

adjusting the relative angular position of said second pair of brushes relative to said first pair of brushes in response to said input command signal to obtain the desired duty cycle of opposing polarities thereby effecting a change in the average current of the respective polarities delivered to the electromechanical device.

15. The method of claim 14, further including the steps of:

generating propulsive gases to drive a turbine;

coupling said propulsive gases to a turbine to generate torque delivered to an output drive shaft;

generating an AC power signal by coupling said drive shaft to an alternator; and rectifying the AC power signal produced by said alternator to produce DC power which is applied across said first pair of brushes.

16. The method of claim 15, further including the step of:

gear coupling the turbine shaft to the cylindrical commutator to cause said commutator to rotate at one-half the desired frequency of the bipolar signal.

* * * * *

UNITED STATES PATENT AND TRADEMARK OFFICE
CERTIFICATE OF CORRECTION

PATENT NO. : 4,656,404
DATED : April 7, 1987
INVENTOR(S) : John F. Klinchuch

It is certified that error appears in the above-identified patent and that said Letters Patent are hereby corrected as shown below:

On the first page, Inventor's name, please change "Klinchurch" to --Klinchuch--.

Column 1, line 6, correct the Contract No. to read --F04704-84-C-0061--.

Column 1, line 61, change "driven" to read --drive--.

Column 2, line 34, change "driven" to read --drive--.

Column 3, line 33, change "pair" to read --pairs--.

Column 4, line 50, change "driven" to read --drive--.

Column 7, line 35, change "contains" to read --continues--.

Signed and Sealed this

Twenty-fifth Day of August, 1987

*Attest:*

DONALD J. QUIGG

*Attesting Officer*   Commissioner of Patents and Trademarks